US011167866B2

(12) United States Patent
Bartlett et al.

(10) Patent No.: US 11,167,866 B2
(45) Date of Patent: Nov. 9, 2021

(54) LOCALIZATION SYSTEM AND METHODS

(71) Applicant: Southwest Research Institute, San Antonio, TX (US)

(72) Inventors: Glynn R. Bartlett, Boerne, TX (US); Jeremy K. Zoss, San Antonio, TX (US); William C. Flannigan, San Antonio, TX (US); Peter Boeijink, Schiphol-Rijk (NL)

(73) Assignee: Southwest Research Institute, San Antonio, TX (US)

( * ) Notice: Subject to any disclaimer, the term of this patent is extended or adjusted under 35 U.S.C. 154(b) by 601 days.

(21) Appl. No.: 16/015,240

(22) Filed: Jun. 22, 2018

(65) Prior Publication Data

US 2019/0391269 A1 Dec. 26, 2019

(51) Int. Cl.

| | |
|---|---|
| ***G01C 3/08*** | (2006.01) |
| ***B64F 5/60*** | (2017.01) |
| ***G01S 7/481*** | (2006.01) |
| ***G01S 17/89*** | (2020.01) |

(52) U.S. Cl.

CPC .............. *B64F 5/60* (2017.01); *G01S 7/4817* (2013.01); *G01S 17/89* (2013.01)

(58) Field of Classification Search

CPC .......... G01S 17/87; G01S 17/48; G01S 17/88; G01S 17/89; G01S 7/4817; B25J 9/1676; B64F 5/60; G05B 2219/401; G05B 2219/45071; G05B 2219/40564

See application file for complete search history.

(56) References Cited

U.S. PATENT DOCUMENTS

| | | | | |
|---|---|---|---|---|
| 3,255,893 | A | 6/1966 | Hainer et al. | |
| 3,359,687 | A | 12/1967 | Name | |
| 3,876,255 | A | 4/1975 | Ilon | |
| 4,060,315 | A | 11/1977 | Heinz | |
| 4,651,283 | A * | 3/1987 | Sciaky | B23K 26/04 219/121.63 |
| 4,659,902 | A | 4/1987 | Swensrud et al. | |
| 5,387,969 | A | 2/1995 | Marantette | |
| 5,801,834 | A * | 9/1998 | Danielson | B21D 1/14 356/620 |
| 6,392,222 | B1 | 5/2002 | Greenwood | |
| 9,187,188 | B2 * | 11/2015 | Richter | G06T 7/001 |
| 2007/0076193 | A1 * | 4/2007 | Flannigan | G01B 5/0025 356/155 |
| 2017/0060115 | A1 | 3/2017 | Battles et al. | |

FOREIGN PATENT DOCUMENTS

| | | | |
|---|---|---|---|
| EP | 0224451 | B1 | 6/1989 |
| WO | 2016068174 | A1 | 5/2016 |

* cited by examiner

*Primary Examiner* — Mark Hellner

(74) *Attorney, Agent, or Firm* — N.V. Nederlandsch Octrooibureau; Catherine A. Shultz; Katelyn J. Bernier

(57) ABSTRACT

A method of determining the position and orientation of a moveable object includes a) connecting a plurality of targets to the object at known points on the object such that the targets will move with the object; b) scanning the surface of the object and at least some of the plurality of targets to obtain target data; c) comparing the scanned target data to at least one known dimension of one of the plurality of targets; and d) if scanned target data matches the at least one known dimension of one of the plurality of targets, mapping known object model data according to the target data to determine the position and orientation of the object.

18 Claims, 5 Drawing Sheets

38
39
37
33
31
32
33

LOCALIZATION SYSTEM AND METHODS

BACKGROUND

Surface treatment of aircrafts is an important task not only during manufacture but also for the maintenance of aircrafts. The outer paint must be in sufficiently good conditions for the aircraft to be able to perform optimally and safely. Small scratches or lifted parts of paint can affect the aircraft performance. It this thus required to remove the outer paint completely and to apply new paint regularly. However, the paint used on the outer surface of aircrafts, due to the conditions it has to withstand, is not easily removable. Such paint is typically removed by manually applying a chemical solution which is able to dissolve the paint.

Localization systems are often used to survey positions of objects. One example of such a system is a Light Detection and Ranging ("LIDAR") system, which attempts to measure distance to a target by illuminating the target with pulsed laser light and measuring reflected pulses with a sensor. The differences in laser return times and wavelengths can be used to make three-dimensional representations of the target.

Such localization systems are sometimes used for robotic processing on movable workpieces. In such cases, the workpieces are typically rigidly fixture in a known position such the robotic processing can work around that. Fixturing is expensive and burdensome to use because the large moveable object must be placed in a precise known location and orientation to use a previously made three-dimensional scan. In the case of an object such as an aircraft, a previously-made three-dimensional scan could only be used when a precise hangar position is available and the aircraft is skillfully oriented to be back in that exact position, and the aircraft stays in the exact position. Keeping the aircraft in the exact position also requires other external tools, such as jacks as aircraft material tends to change position due to outside influences, e.g., temperature.

SUMMARY

According to a first aspect of the invention, a method of determining the position and orientation of a moveable object comprises a) connecting a plurality of targets to the object at known points on the object such that the targets will move with the object; b) scanning the surface of the object and at least some of the plurality of targets to obtain target data; c) comparing the scanned target data to at least one known dimension of one of the plurality of targets; and d) if scanned target data matches the at least one known dimension of one of the plurality of targets, mapping known object model data according to the target data to determine the position and orientation of the object. Such a method can allow for continuously finding the position and orientation of a large moveable object, such as an aircraft without requiring fixturing. This can allow for operations around and near the object (e.g., aircraft surface treatments) while avoiding the potential of damaging the object by coming into contact with it.

According to an embodiment, the step b) of scanning the surface of the object is performed with a first scanner, and the method further comprises scanning the surface of the object and at least some of the plurality of targets to obtain target data with a second scanner to obtain a second set of target data; and comparing the target data from the first scanner to the target data from the second scanner. Using first and second scanners allows for comparison of scanning data to ensure accurate results. It also provides redundancy in case of failure of one scanner.

According to an embodiment, the step of connecting a plurality of targets to the object comprises connecting a plurality of hanging targets to known points on the object such that the targets will move with the object. Hanging targets allows for determining the position and orientation even when certain parts of the object may move with time (e.g., aircraft wings lowering after refueling). Optionally, the targets are rotatable. This can ensure the target always hangs at a set distance from the object.

According to an embodiment, the step of comparing the scanned target data to at least one known dimension of one of the plurality of targets comprises locating an expected centroid of a target; defining axes by the centroid of the target; repositioning the axes to the actual center based on known dimensions of the target; and comparing whether a known dimension of the target matches the scanned dimension.

According to an embodiment, step c) comprises comparing a scanned target radius to a known radius of one of the plurality of targets. This can ensure accuracy of scanning data.

According to an embodiment, step b) comprises rotating a scanner directed at the object and rotated such that it senses at least some of the plurality of targets with rotation in a range of at least 180 degrees to obtain target data. Rotation of at least 180 degrees allows for a wide range of view of scanners. Optionally, step b) further comprises moving the scanner at an angle such that the scanner moves vertically and horizontally while rotating to sense further target data. This can help to determine accurate special positioning of targets.

According to an embodiment, the object is an aircraft and the known object model data comprises known dimensions of a particular object type.

According to an embodiment, the targets are positioned at specific known points based on the particular object type. This can be especially useful for large moveable objects such as an aircraft. Designated positions can be chosen for targets to ensure that sufficient targets are always visible and that particular parts of the object (e.g., parts prone to movement) have targets connected.

According to a further aspect, a method of orienting a robot to an object comprises a) connecting a plurality of targets to the object at known points on the object; b) scanning at least some of the plurality of targets to obtain target data; c) comparing the scanned target data to at least one known dimension of one of the plurality of targets; d) if the scanned target data matches the at least one known dimension of one of the plurality of targets, mapping known object model data to fit the target data to determine the location and orientation of the known object; e) performing steps b)-d) with a second scanner; and f) comparing the results of the first scanner and the second scanner. Such a method can accurately determine the spatial positioning of an object.

According to an embodiment, the method further comprises allowing movement of the robot only if the results of step f) show the same location and orientation of the large object from the first scanner and the second scanner. Using two scanners and allowing for movement only if they agree provides a reliable safety mechanism into the system to ensure accurate orienting.

According to an embodiment, the object is split into sections, and steps a)-g) are performed for each section. This can allow for the detection of non-rigid deformations of the object, e.g., when a wing structure of an aircraft goes from an unfueled to a fueled condition. Optionally, in an aircraft, the split could be into different sections for each wing and the fuselage.

According to a further aspect, an object localization system comprises a plurality of targets connectable to an object, each target with a retroflector; at least one scanner able to emit a light ray and sense reflected light from one or more of the plurality of targets to obtain target data; a controller which is configured to: analyse the target data from the scanner and compare it to known data to represent a true position of the target; and use the true position, known locations of the plurality of targets, and known object model data to map the position and orientation of the aircraft. Such a system can allow for simple and accurate mapping of the position and orientation of an object.

According to an embodiment, the plurality of targets each comprise a cylindrical body portion with one or more retroreflector sections, one of more dark (non-reflective) sections, and at least two transitions between reflective and non-reflective sections; and a hanging connector for connecting to the aircraft. Having two transitions ensures that scanners can accurately pick up targets and dimensions, and a hanging connection ensures that the target moves with the object.

According to an embodiment, wherein the hanging connector comprises an aircraft surface connector; a cable connecting to the aircraft surface connector; and a ball joint connecting the cylindrical body portion to the cable. Such a connector allows for rotation and vertical hanging of the target, ensuring that the positioning with respect to the object surface remains constant.

According to an embodiment, the at least one scanner comprises a first scanner and a second scanner, each rotatably mounted on a base for scanning at least 180 degrees each. Using first and second scanners provides backup in case of a failure, and allows for comparisons to ensure accuracy.

According to an embodiment, the controller is further configured to analyse the target data from the first scanner and compare it to known data to represent a true position of the target; use the true position, known locations of the plurality of targets, and known aircraft model data to form a first map of the position and orientation of the aircraft; analyse the target data from the second scanner and compare it to known data to represent a true position of the target; use the true position, known locations of the plurality of targets, and known aircraft model data to form a second map of the position and orientation of the aircraft; and compare the first map to the second map.

According to an embodiment, the at least one scanner is rotatable and further moveable in the horizontal and vertical direction to move at an angle while scanning.

DETAILED DESCRIPTION

Figure 1:
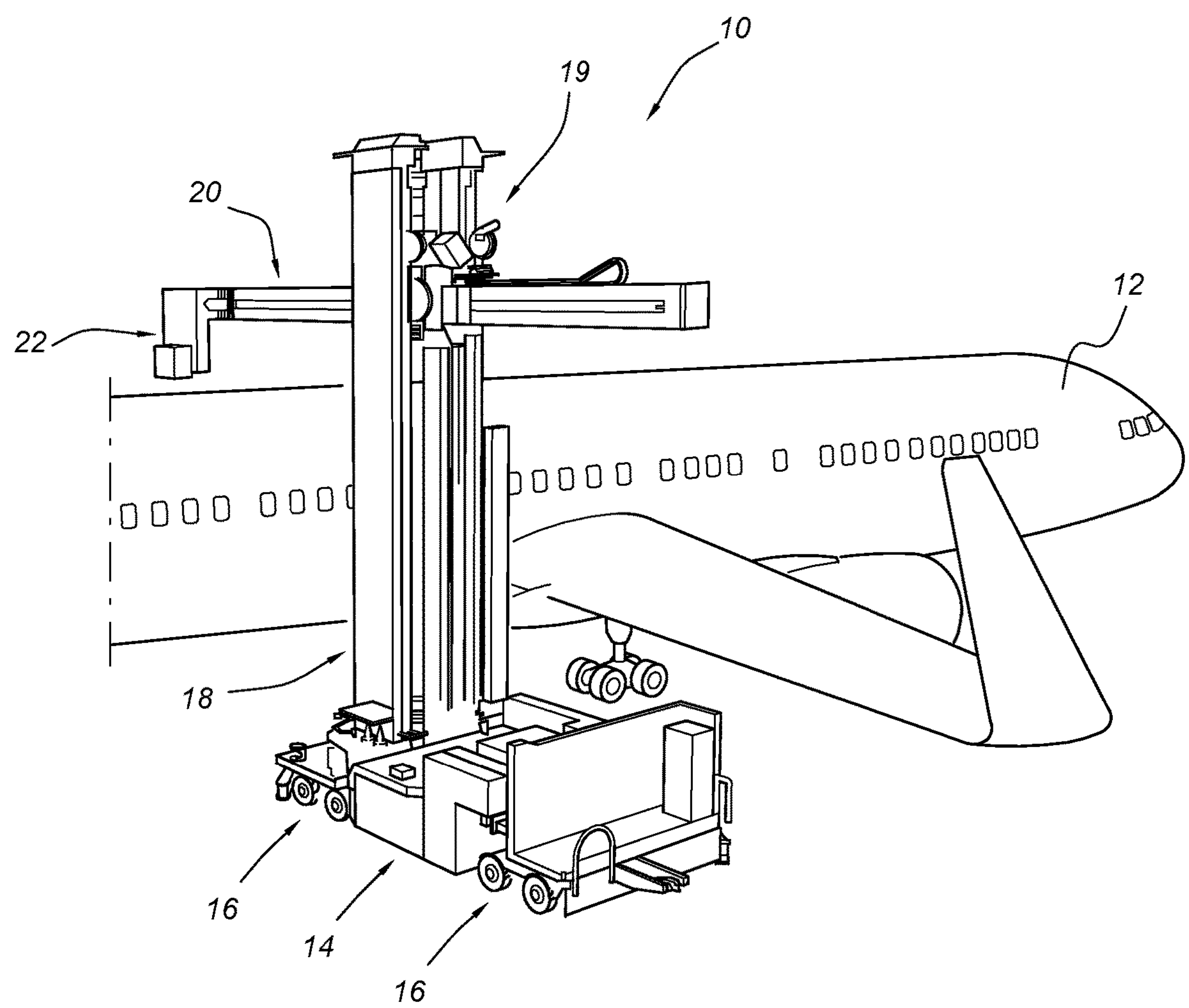
FIG. 1 illustrates a perspective view of a robotic system used for surface treatment of large vehicles.

FIG. 1 illustrates a perspective view of a robotic system 10 used for surface treatment of large vehicles. While system 10 is shown and described as a paint removal system using a high-power laser to ablate coatings by scanning a laser across a surface of aircraft 12, it should be understood that system 10 could be used to provide many different surface treatments, such as painting, sanding, direct printing, applying or removing other coatings or surface treatments, washing, wipe-down, surface scanning or inspection and repairs. Additionally, system 10 could be used with other vehicles or structures, such as helicopters, ships, trucks, cars, underwater vehicles, space craft; or any vehicles or structures that involve large areas and/or complicated positioning to reach all surfaces.

System 10 is a self-contained surface treatment system with mobile base 14 connected to omnidirectional bogies 16. Any needed utilities, such as electrical power, cooling water and gas may be provided via a tether, though in some cases, only some utilities or even none of these would be needed (e.g., power is provided by batteries), making system 10 flexible for operations at a variety of locations. Mobile base 14 is able to accommodate various aircraft and hangar variations by being relatively compact yet stable such that it can drive up to aircraft 12, "park" itself and provide a stable base for operations. Omnidirectional bogies 16 and a flexible suspension system result in mobile base 14 being able to evenly distribute the large load of system 10 while also being able to smoothly navigate areas that are not level or have obstacles. System 10 also includes a number of other components on base 14 related to the particular surface treatment, for example, a laser generator, exhaust filters, batteries, etc.

Surface treatments are delivered from base 14 through mast 18, shoulder 19, arm 20 and wrist 22, which in this case together provide the structure to enable the laser beam to transport from base 14 to any desired point on the aircraft 12 surface. Mast 18 and arm 20 are extendable and are able to rotate, though the rotation of mast 18 may be through base 14 movement or rotation. Shoulder 19 allows for the rotation and translation of arm 20 with respect to mast 18. Arm 20 is also able to move up and down through the length of mast 18. Wrist 22 provides more axes of flexibility, for example 3, to provide system 10 the ability to reach and treat all surfaces of aircraft 12.

The laser is transported from base 14 to wrist 22 through hollow portions of mast 18, shoulder 19, arm 20 and wrist 22 and is guided by a series of mirrors with a mirror control system to ensure accurate laser beam positioning. System 10 can also include an exhaust gas system for removing the effluent through the interior of mast 18, shoulder 19, arm 20 and wrist 22; and a localization system 30 for positioning and orientation of all system 10 components with respect to aircraft 12.

Figure 2A:
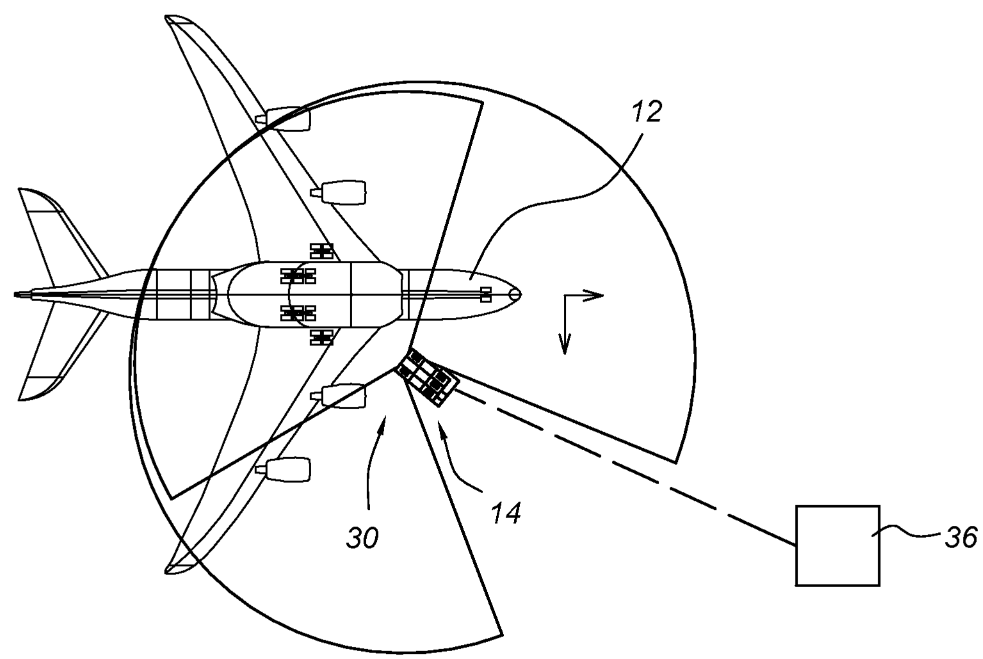
FIG. 2*a* shows a top view of a localization system in use to map an aircraft.
Figure 2B:
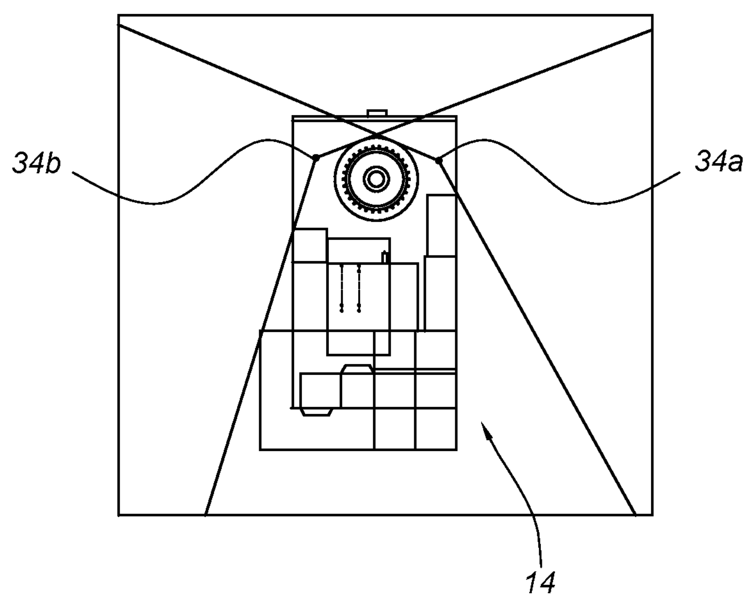
FIG. 2*b* shows an enlarged portion of FIG. 2*a;*
Figure 2C:
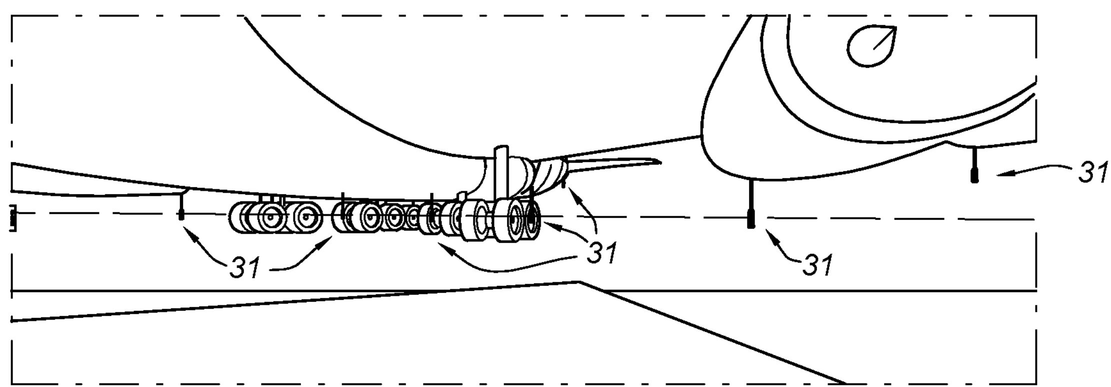
FIG. 2*c* shows a perspective view of targets connected to the aircraft.
Figure 2D:
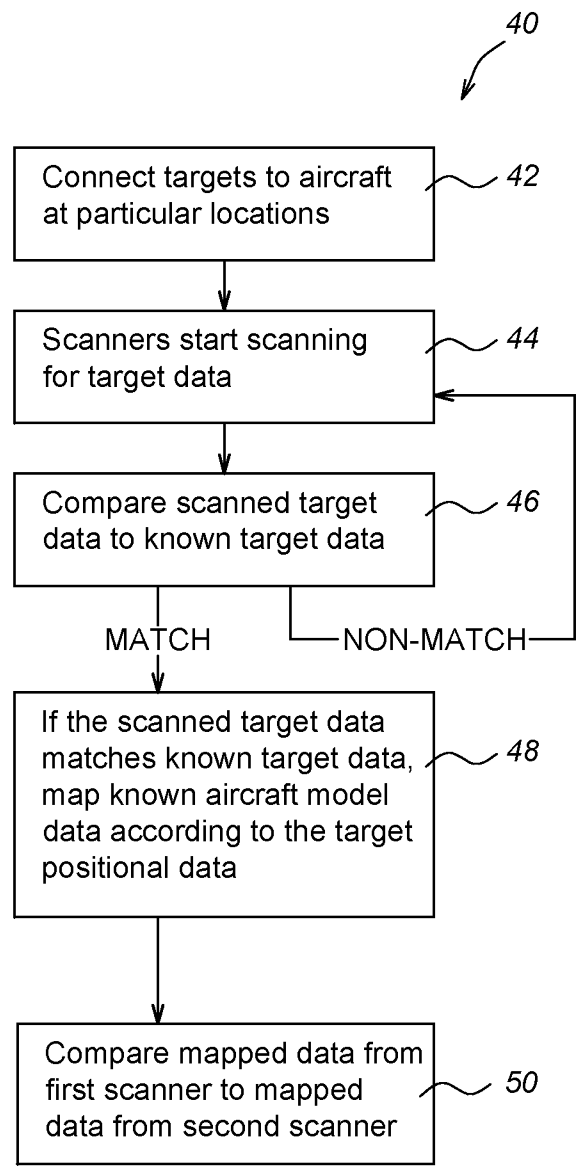
FIG. 2*d* shows a method of determining the three-dimensional location of the aircraft performed by the localization system.

FIG. 2*a* shows a top view of a localization system 30 in use to map aircraft 12, FIG. 2*b* shows an enlarged portion of FIG. 2*a*; FIG. 2*c* shows a perspective view of targets 32 connected to aircraft 12; and FIG. 2*d* shows a method 40 of determining the three-dimensional position and orientation of aircraft 12 performed by localization system 30. Localization system 30 includes targets 32, scanners 34*a*, 34*b* and controller 36.

Scanners 34*a*, 34*b* are located on or connected to base 14. The positioning of scanners 34*a*, 34*b* are for example purposes only, and they can be located at other positions connected to base 14. Scanners 34*a*, 34*b* are able to rotate at least 180 degrees, in this case about 270 degrees as shown by the scanning areas in FIG. 2*a*. Additionally scanners 34*a*, 34*b* are able to move at an angle, horizontally and vertically such that they can obtain more positional data when scanning. This can be through the use of a track, arm or other movement system on or connected to base 14. Scanners 34*a*, 34*b* can be a number of different types of scanners, and work by emitting a light ray and sensing light reflected back.

Controller 36 can be located on base 14 or remotely from base 14 and communicate (wirelessly or through wired connections) with scanners 34*a*, 34*b*. Controller is configured to analyse target data from the scanner, reference one or more databases containing information regarding known aircraft models, positioning for targets relating to known aircraft models, known target dimensions, etc. Controller can be software and/or hardware with a processor for receiving, storing, analysing processing and/or sending data. The databases can be located within the computer system of controller 36 or could be accessed remotely. In some embodiments, this can be a distributed network of specific computers which communicate with each other. Controller could also be connected to a user interface, with which a user could interact, for example, for inputting the aircraft type, starting the scanning, viewing mapping, etc.

Removable targets 31, also known as passive markers, include a retroreflective surface 32 and (non-reflective) black portions 33, and contain at least 2 transitions between the black (non-reflective) and retroreflective section(s) 32. The distance between the transitions is known (e.g., in mm), and the targets 31 are connected to the aircraft on known positions x and y.

Figure 3:
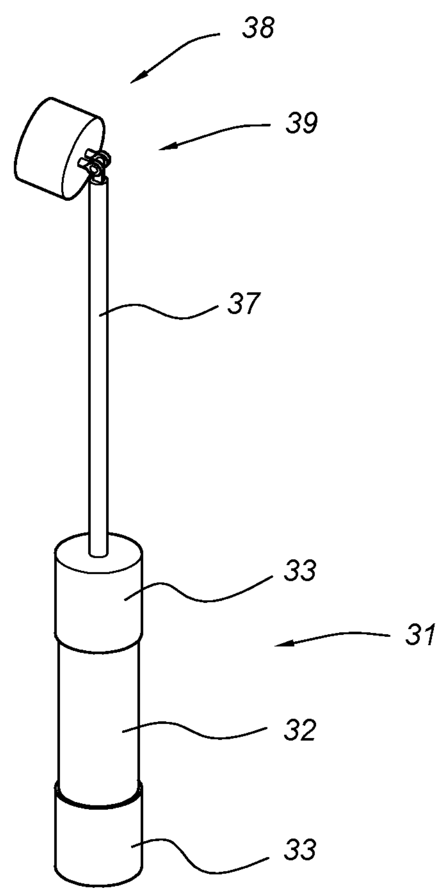
FIG. 3 shows a perspective view of a target.

FIG. 3 shows an example target 31 for use with localization system 30. Target 31 includes retroreflective portion 32, black portions 33, cable 37, surface connector 38 and rotatable joint 38.

Target body with retroreflective portion 32 sitting within black portions 33 is generally cylindrical. The use of retroreflective portions adjunct to black portions ensures that there is a clear distinction between for scanners 34*a*, 34*b*. Target body can vary in dimension, for example, 4 inches (10.2 cm) in diameter, and 18 inches (45.7 cm) tall. The configuration is for example purposes and may be changed.

Pin 37 connects to a top end of the target body and connects to aircraft surface connector 38 through rotatable joint 39, e.g., a ball joint to aim the target body vertical hanging free in space by gravity. Aircraft surface connector can removably connect to the surface of aircraft 12 through a number of different means, for example, magnets, bolt head clips, hole clips, or other temporary holding devices.

Targets 31 hang vertically from aircraft 12, and are rotatable due to the rotatable joint 39 between surface connector 38 and pin 37. The use of cylindrical targets which will always hang vertically ensures that targets do not have to be realigned upon movements of aircraft 12 or base 14. They may be simply connected at the specific locations on aircraft 12, and will function with localization system 30 and method 40.

The method 40 of localization starts with removably connecting targets 32 to aircraft 12 at particular locations (step 42). Targets 32 hang from aircraft 12, and are moveable with aircraft once connected, such that localization method 40 can accommodate any movements of aircraft 12 or aircraft parts (e.g., wings) to which a target 32 is connected. The connection locations are based on the type of aircraft 12, and controller 36 (or another system) can indicate the locations where targets 32 are to be connected. Typically a number of targets 32 are used, for example, ten to twenty targets 32 such that a number of targets 12 are visible from any location for scanning. This can ensure that an accurate three-dimensional representation of the target locations can be formed and checked.

Next, scanners 34*a*, 34*b* start scanning for target data (step 44). This involves rotating the scanners 34*a*, 34*b*, and moving at an angle simultaneously in the vertical and horizontal directions. The base 14 uses a continuous metric measurement system to obtain the x, y positioning of the base within the hanger or other space in which it is operating. The z position is a fixed number based on the based position in park mode (on its jacks). The scanners 34*a*, 34*b* with known x, y, and z position will then detect the retroreflective surfaces 32 of targets 31, and the rotated movement allows the scanner to determine the $\alpha$ and $\beta$ angles of each retroreflective portion 32 in the field of view of that scanner, thus obtaining target data on positioning horizontal.

The scanners 34*a*, 34*b* simultaneous increase in scanning angle while rotating. The scanners' 34*a*, 34*b* angle at the two transitions on the target provides two $\gamma$ (gamma) angles of each target, and knowing the fixed distance on the target between the two transitions allows for calculating target data on the centroid position of the targets 31 vertically.

Scanners 34*a*, 34*b* will also be able to obtain target data related to a dimension of target, for example, a radius or height of the retroreflective portion 32. This can be done by locating an expected centroid of a target, defining axes by the centroid of the target, repositioning the axes to the actual center based on known dimensions of the target and comparing whether a known dimension of the target matches the scanned dimension. Locating the centroid can also help with mapping at step 48 by knowing the centroid and the offset from the connector to the aircraft surface.

The target data obtained from scanning can then be compared to known target data (step 46). Known target data can be, for example, a radius, diameter, height or other measured dimension of target 31. The known dimension is compared to the scanned dimension measurement by controller 36. This comparison can include a number of dimensions, for example, radius and the height of the retroreflector 32 between the black portions 33 as a check to ensure the scanners 34*a*, 34*b* are picking up only the targets 31 and not other reflective objects.

If the results of the comparison in step 46 indicates a match within an acceptable tolerance, the target positional data is used to map the known aircraft model according to the target positional data (step 48). The tolerance can be set, for example, matching within 75%, and/or could be set by controller based on scanners 34*a*, 34*b*, the aircraft being scanned, or other factors.

Because the location of the targets 31 with respect to the specific aircraft 12 are known (due to connecting the targets 31 at specific locations), the length between the centroid of the target and the connection to the aircraft is known, and the model dimensions of that aircraft are known, the accurate target positional data can then be used to determine the position and orientation of aircraft 12 by using the known model dimensions and positioning with respect to scanned target data. This is then used for accurate robotic system 10 positioning with respect to aircraft 12 to ensure that robotic system 10 does not touch and damage aircraft 12 surface during operations or movement.

If the results of comparison step 46 do not result in a match, the scanners 34*a*, 34*b* re-scan, going back to step 44 until a sufficient match is made to create a positional map.

This can be done any number of times until a match is made. This could also involve moving the base 14 and/or adding targets 31 if, for example, the initial position of base 14 does not result in enough targets 31 being visible to scanners 34*a*, 34*b* for sufficient and accurate target data to be obtained.

The use of two scanners 34*a*, 34*b* can allow for individual mapping using steps 44-48 for each individual scanners. Once a map is made in relation to each scanner, a first map of position and orientation of aircraft 12 according to scanner 34*a* data, and a second map of position and orientation of aircraft 12 according to scanner 34*b* data, the first map and the second map can be compared to ensure they align (within tolerances). Tolerances would typically be about 1 cm, as the laser paint removal system output will travel close to aircraft 12 outer surface, for example with a clearance of about 20 cm. The controller 36 could then send a signal that robotic system 10 is only allowed movement if the first map and the second map sufficiently align.

Localization system 30 and method 40 allow for continuously finding the position and orientation of a large moveable object, such as aircraft 12 without requiring the fixturing of past systems. It is very important that operations of robotic system 10 are performed such that no contact is made with the aircraft so as not to damage any part of the aircraft body, and to maintain the precise aerodynamic shape relied upon for lift and flight, and localization system 30 and method 40 ensure that robotic system 10 can operate around any aircraft 12 at any location without touching and damaging it.

The use of retroreflective material 32 and a plurality of targets 31 which are cylindrical and always hang vertically ensures that the targets are visible to scanners 34*a*, 34*b* and that scanners can easily filter targets 31 from background sensor return data or false targets. The use of two rotatable and moveable scanners 34*a*, 34*b* allows for obtaining accurate target data on positioning and dimensions, as well as a check to compare that data and ensure it is correct for modeling the position and orientation of aircraft 12. The number of targets 31 also provides additional redundancies. The use of localization system 30 and method 40 results in a non-contact way to map the exact position and orientation of aircraft 12 no matter where it is located. The method 40 can be used continuously to real-time monitor the position and orientation of aircraft 12 such that changes in position and orientation, e.g., due to environment or other adjustments during processing, can be accounted for. Because targets 31 hang vertically due to gravity and are rotatable, if there is any shift or movement in the objects which targets are attached, targets 31 shift and move accordingly, and localization system and method can update the position and orientation according to the shifting and movement of targets. The use of real-time monitoring is also extremely useful for robotic system 10 that operates close to aircraft surface 12, with a number of moving parts what must be precisely aligned and controlled with respect to the aircraft surface 12 during operations.

In some embodiments of method, the aircraft 12 (or other vehicle) which the method 40 is used in association with could be zoned into separate sections for mapping. This could allow for the detection of non-rigid deformations of the aircraft 12, for example, when a wing structure goes from a fueled to unfueled condition. Each section could have its own reference points and known model data, thereby permitting the use of method 40 for individual zones. In an aircraft 12, this may be used to zone wings and fuselage separately, for example. In such an embodiment, targets could have different configurations for each zone such that the scanners 34*a*, 34*b* only scan for the targets of the specific zone being mapped.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A method of determining the position and orientation of a moveable object, the method comprising:
- a) connecting a plurality of targets to the object at known points on the object such that the targets will move with the object;
- b) scanning the surface of the object and at least some of the plurality of targets to obtain target data;
- c) comparing the scanned target data to at least one known dimension of one of the plurality of targets by:
  - locating an expected centroid of a target;
  - defining axes by the centroid of the target;
  - repositioning the axes to the actual center based on known dimensions of the target; and
  - comparing whether a known dimension of the target matches the scanned dimension; and
- d) if scanned target data matches the at least one known dimension of one of the plurality of targets, mapping known object model data according to the target data to determine the position and orientation of the object.

2. The method of claim 1, wherein the step b) of scanning the surface of the object is performed with a first scanner, and the method further comprises:
- scanning the surface of the object and at least some of the plurality of targets to obtain target data with a second scanner to obtain a second set of target data; and
- comparing the target data from the first scanner to the target data from the second scanner.

3. The method of claim 1, wherein the step of connecting a plurality of targets to the object comprises:
- connecting a plurality of hanging targets to known points on the object such that the targets will move with the object.

4. The method of claim 3, wherein the targets are rotatable.

5. The method of claim 1, wherein step c) comprises comparing a scanned target radius to a known radius of one of the plurality of targets.

6. The method of claim 1, wherein step b) comprises rotating a scanner directed at the object and rotated such that it senses at least some of the plurality of targets with rotation in a range of at least 180 degrees to obtain target data.

7. The method of claim 6, wherein step b) further comprises moving the scanner at an angle such that the scanner moves vertically and horizontally while rotating to sense further target data.

8. The method of claim 1, wherein the object is an aircraft and the known object model data comprises known dimensions of a particular object type.

9. The method of claim 8, wherein the targets are positioned at specific known points based on the particular object type.

10. A method of orienting a robot to an object, the method comprising:

a) connecting a plurality of targets to the object at known points on the object;

b) scanning at least some of the plurality of targets to obtain target data;

c) comparing the scanned target data to at least one known dimension of one of the plurality of targets;

d) if the scanned target data matches the at least one known dimension of one of the plurality of targets, mapping known object model data to fit the target data to determine the location and orientation of the known object;

e) performing steps b)-d) with a second scanner; and f) comparing the results of the first scanner and the second scanner.

11. The method of claim 10, and further comprising:

allowing movement of the robot only if the results of step f) show the same location and orientation of the large object from the first scanner and the second scanner.

12. The method of claim 10, wherein the object is split into sections, and steps a)-g) are performed for each section.

13. The method of claim 12 wherein the object is an aircraft, and wherein the aircraft is split into different sections for each wing and the fuselage.

14. An object localization system, the system comprising:

a plurality of targets connectable to an object, each target comprising a cylindrical body portion with a retroflector and a hanging connector comprising an object surface connector, a pin connecting to the object surface connector, and a ball joint connecting the cylindrical body portion to the pin;

at least one scanner able to emit a light ray and sense reflected light from one or more of the plurality of targets to obtain target data;

a controller which is configured to:

analyse the target data from the scanner and compare it to known data to represent a true position of the target; and use the true position, known locations of the plurality of targets, and known object model data to map the position and orientation of the object.

15. The system of claim 14, and wherein the plurality of targets each comprise:

a cylindrical body portion with one or more retroreflector sections, one of more dark (non-reflective) sections, and at least two transitions between reflective and non-reflective sections;

the hanging connector for connecting to the object.

16. The system of claim 14, wherein the at least one scanner comprises a first scanner and a second scanner, each rotatably mounted on a base for scanning at least 180 degrees each.

17. The system of claim 16, wherein the controller is further configured to analyse the target data from the first scanner and compare it to known data to represent a true position of the target;

use the true position, known locations of the plurality of targets, and known object model data to form a first map of the position and orientation of the object;

analyse the target data from the second scanner and compare it to known data to represent a true position of the target;

use the true position, known locations of the plurality of targets, and known object model data to form a second map of the position and orientation of the object; and compare the first map to the second map.

18. The system of claim 14, wherein the at least one scanner is rotatable and further moveable in the horizontal and vertical direction to move at an angle while scanning.

* * * * *